(12) United States Patent
Bass et al.

(10) Patent No.: US 6,550,406 B2
(45) Date of Patent: Apr. 22, 2003

(54) SOD ROLL INSTALLATION DEVICE

(76) Inventors: Anthony C. Bass, 463 Old Hawkinsville Rd., Bonaire, GA (US) 31005; Luther C. Bass, 463 Old Hawkinsville Rd., Bonaire, GA (US) 31005

( * ) Notice: Subject to any disclaimer, the term of this patent is extended or adjusted under 35 U.S.C. 154(b) by 0 days.

(21) Appl. No.: 09/813,621

(22) Filed: Mar. 21, 2001

(65) Prior Publication Data

US 2002/0144825 A1 Oct. 10, 2002

(51) Int. Cl.[7] .................................................. A01B 45/04
(52) U.S. Cl. ........................ 111/100; 111/901; 111/200; 172/19; 172/817; 414/911
(58) Field of Search ..................... 172/19, 20, 817, 172/245; 414/911; 111/200, 901, 100

(56) References Cited

U.S. PATENT DOCUMENTS

| | | |
|---|---|---|
| 3,982,711 A | 9/1976 | Bradley et al. |
| 4,049,140 A | 9/1977 | Roose |
| 4,109,729 A * | 8/1978 | Kaercher, Jr. |
| 4,113,116 A | 9/1978 | Brandt |
| 4,175,496 A | 11/1979 | Rehbein |
| 4,354,556 A | 10/1982 | Evans |
| 4,364,701 A | 12/1982 | Lynch et al. |
| 4,413,940 A | 11/1983 | Southard et al. |
| 4,489,789 A | 12/1984 | Pearce |
| 4,518,299 A | 5/1985 | Vanderlei |
| 4,648,769 A | 3/1987 | Stirling |
| 4,754,815 A | 7/1988 | Brouwer et al. |
| 4,777,890 A | 10/1988 | Raymond |
| 4,878,542 A | 11/1989 | Brouwer et al. |
| 4,890,801 A | 1/1990 | Brouwer et al. |
| 4,966,239 A * | 10/1990 | Hutchison |
| 4,968,205 A | 11/1990 | Biasotto et al. |
| 5,098,252 A | 3/1992 | Sheesley et al. |
| 5,129,462 A | 7/1992 | Mail |
| 5,215,278 A | 6/1993 | Hess |
| 5,307,880 A | 5/1994 | Woerner |
| 5,437,528 A | 8/1995 | Decker |
| 5,454,433 A | 10/1995 | Worrel et al. |
| 5,509,770 A | 4/1996 | Burenga |
| 5,571,252 A | 11/1996 | Worrel et al. |
| 5,626,195 A | 5/1997 | Dover |
| 5,664,924 A | 9/1997 | Barker |
| 5,690,178 A | 11/1997 | Zehrung, Jr. et al. |
| 5,697,452 A | 12/1997 | Link |
| 5,775,436 A | 7/1998 | Noyes, II et al. |
| 5,860,244 A | 1/1999 | Casimaty et al. |
| 5,938,392 A | 8/1999 | Duck |
| 5,950,407 A | 9/1999 | Rosen |
| 5,988,289 A | 11/1999 | Holland et al. |
| 6,131,668 A | 10/2000 | Houska |
| 6,135,211 A | 10/2000 | Schroeder |
| 6,179,060 B1 * | 1/2001 | Halter |
| 6,213,218 B1 * | 4/2001 | Miller |
| 6,279,665 B1 * | 8/2001 | Devaney |

FOREIGN PATENT DOCUMENTS

EP          581 607 A1  *  2/1994

OTHER PUBLICATIONS

Toro, Dingo Eliminator Scarifier/Grading Rake Attachment, www.toro.com/landscape/sitework/earth3.
Toro, Dingo Tiller Attachment, www.toro.com/lanscape/sitework/earth6.html; The Toro Company, Sitework.
Toro, Dingo 4–in–1 Bucket Attachment, www.toro.com/landscape/sitework/bucket3.html; The Toro Company, Sitework Systems, 8111 Lyndale Avenue South, Bloomington, MN, 55420; (952)888–8801.

* cited by examiner

*Primary Examiner*—Victor Batson
(74) *Attorney, Agent, or Firm*—Myers & Kaplan LLC; Joel D. Myers; Barry E. Kaplan

(57) ABSTRACT

A sod roll installation device for mounting to a mini skid steer utility loader, wherein a steel frame, having extended, braced arms with integrally defined locking wells therein, secures an elongated rod having a large roll of sod mounted thereon, thereby enabling one individual to quickly move, unload and install large rolls of sod.

15 Claims, 3 Drawing Sheets

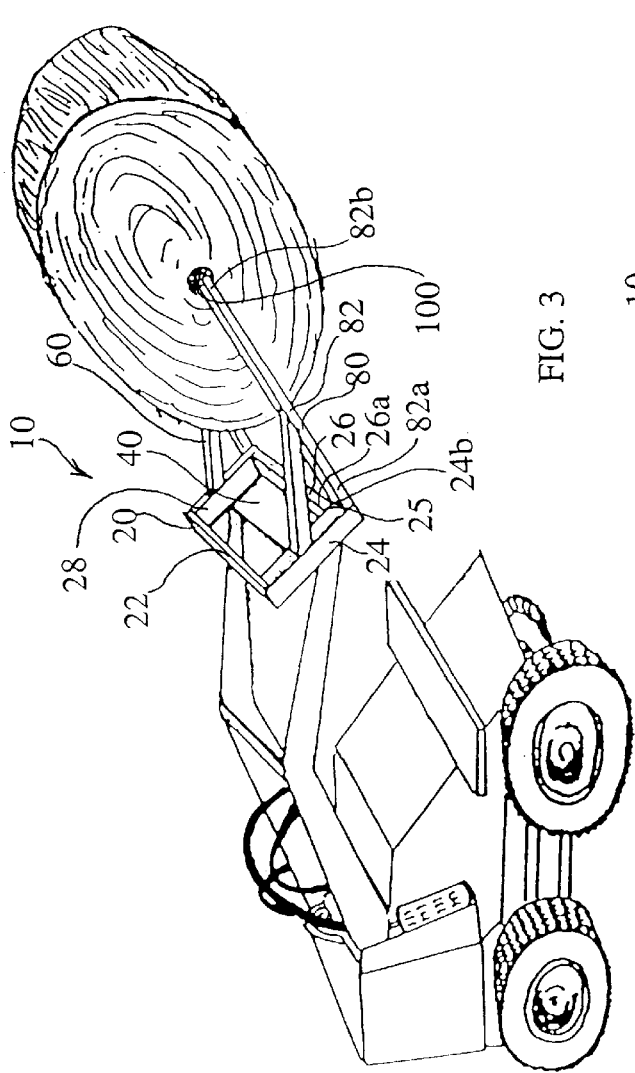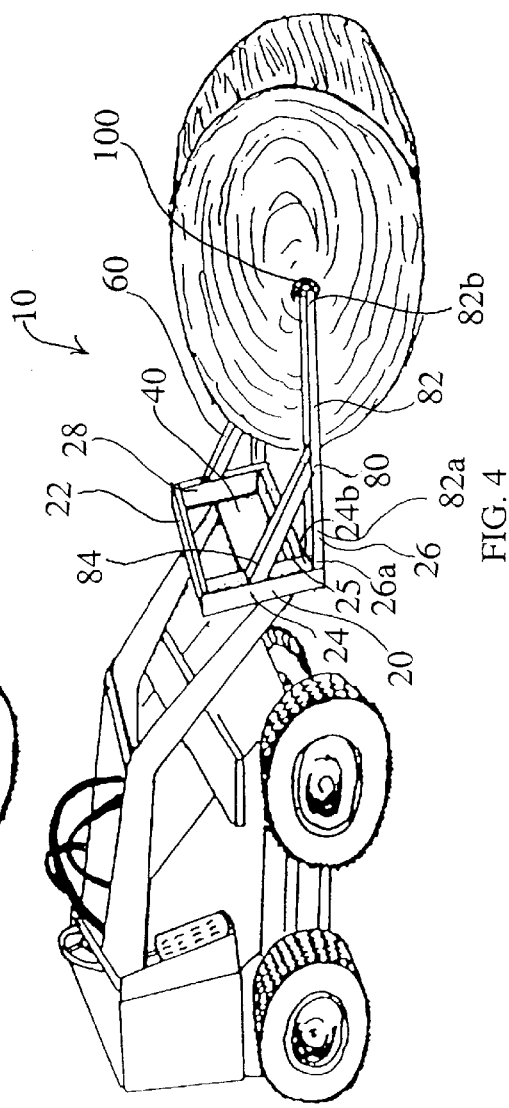

SOD ROLL INSTALLATION DEVICE

TECHNICAL FIELD

The present invention relates generally to sod installation devices and, more specifically, to a sod roll installation device capable of mounting to a mini-skid steer loader, thereby enabling one individual to quickly move, unload and install large rolls of sod. The present invention is particularly useful in, although not strictly limited to, landscaping applications desiring utilization of a compact utility loader, such as those sold under the trademark DINGO, for assistance with laying sod.

BACKGROUND OF THE INVENTION

The most notable feature of many landscapes is the grass. Whether carpeting the golf course of a well-known country club, covering a professional ball field or simply enhancing a homeowner's property, grass can be invaluable. A lush green and healthy lawn adds to real estate value and increases the sporting appeal of ball fields.

Unfortunately, it can be expensive to create a lush green grass backdrop for a landscape. Although seeding is less costly, the length of time necessary for prepared seeds to result in full growth is often unacceptable. Moreover, the growth density of seeding is often inconsistent and this is undesirable for many applications. Sod offers a quickly flourishing alternative to seeding, however, traditionally at a higher price.

A large portion of the expense of a new lawn created with sod can usually be attributed to installation costs. This results from the inherently labor intensive sod laying process. Each piece of sod on a pallet of cut sod is heavy and unwieldy. Large areas require numerous pallets, with laborious placement of each piece of sod individually.

Sod farming and harvesting methods have been developed in response to this disadvantage, wherein sod is harvested in elongated rolled strips in lieu of cut pieces. To handle and maneuver these large rolls, devices have been designed; however, these devices are disadvantageous.

One such device, described in U.S. Pat. No. 5,307,880 to Woerner, is a dedicated walk-behind sod layer with a single rod sod roll support system. While the Woerner device does enable one individual to handle a roll of sod, the speed of installation is disadvantageously limited by the walking pace of the installer. In addition, this design still requires substantial manual labor. Moreover, since no locking mechanism is provided to prevent unwanted vertical movement of the rod, undesired release of the rod is possible.

Another type of dedicated sod laying device is described in U.S. Pat. No. 5,697,452 to Link. Incorporating a three-wheeled vehicle into the complex design, the Link machine enables the laying of sod at a faster speed than walking. However, the complexity of the dedicated device disadvantageously indicates a substantial prohibitive expense. Unlike the Woerner device, the Link machine does describe a locking mechanism to prevent unwanted vertical movement of the rod. However, the mechanism resides in individual capturing hooks, each mounted on the rod support arms. The individual nature of these hooks, coupled with the fact that they are mounted to the outer surface of the rod support arms, disadvantageously compromises their strength. Once a roll of sod is placed onto the rod, the tremendous weight resulting from forward and backward movement thereof must be fully absorbed by a single, independently mounted bracket. Such stress could lead to undesired loosening of the hooks, or even potentially dangerous release of a sod roll if a stressed bracket mount fails. Moreover, the Link locking mechanism inherently requires additional material and labor to attach to the rod support arms and thus, increases costs and reduces manufacturing efficiencies.

An alternative to the dedicated devices of Woerner and Link is described in U.S. Pat. No. 6,131,668 to Houska, wherein a sod laying attachment is described for use with a self-propelled vehicle. This device provides a more economical design by relying on a multi-purpose self-propelled vehicle, thereby eliminating the need for purchasing a dedicated machine. However, the mechanical attachment described by Houska requires multiple linear actuators to be fluidly connected to the base vehicle for operation. This design disadvantageously necessitates continuous reliance upon these actuators for picking up and holding a sod roll because the roll is grasped by actuator dependent sod engagement members in lieu of a support rod. Failure of a linear actuator not only mechanically prevents operation of the device thus prohibiting the installation of sod, but could also result in the potentially dangerous release of a heavy sod roll.

Therefore, it is readily apparent that there is a need for a simple, non-mechanical sod roll installation attachment capable of mounting to a multiple use mini-skid steer loader, wherein a roll of sod is supported by an elongated rod that is securely and integrally held within the installation attachment, thereby enabling one individual to quickly unload, move and install large rolls of sod, thus preventing the above-discussed disadvantages.

BRIEF SUMMARY OF THE INVENTION

Briefly described, in a preferred embodiment, the present invention overcomes the above-mentioned disadvantages, and meets the recognized need for such a device, by providing a sod roll installation device capable of mounting to a mini-skid steer loader, wherein an integrally held elongated rod securely supports a large roll of sod, thereby enabling one individual to quickly move, unload and install large rolls of sod.

According to its major aspects and broadly stated, the present invention is a sod roll installation attachment for mounting on a compact utility loader, wherein a steel frame with integral locking wells for securing an elongated rod therein supports a large roll of sod, thereby enabling quick and easy unloading, moving and installing thereof.

More specifically, the present invention is a welded steel "U-shaped" device for mounting to a skid-steer vehicle, wherein the device frame has two support arms extending outwardly from opposing ends of a rear frame wall, thereby defining the "U" shape of the overall apparatus. Each support arm is braced to enable maximum load bearing strength and each has a specially shaped locking well integrally defined therein. Each end of an elongated rod is removably secured within an inverted "T" shape defined by each well. The elongated rod is capable of supporting a large roll of sod and effectively locks into the integrally shaped wells during use.

A feature and advantage of the present invention is the ability of such a device to provide a sod roll installation device that is simpler in construction than prior art devices and thus less expensive to manufacture.

A feature and advantage of the present invention is the ability of such a device to provide a sod roll installation device that is easily mounted to a multi-use compact utility loader, thereby eliminating the need for a dedicated sod laying vehicle.

A feature and advantage of the present invention is the ability of such a device to provide a sod roll installation device for utilization with a mini skid-steer vehicle, such as, for exemplary purposes only, those sold under t he trademark DINGO.

A feature and advantage of the present invention is the ability of such a device to enable one individual to quickly and easily move, unload and install large rolls of sod.

A feature and advantage of the present invention is the ability of such a device to increase the speed of installation of rolled sod.

A feature and advantage of the present invention is the ability of such a device to provide a more secure carrying rod and thus prevent undesired and potentially dangerous release of a large roll of sod therefrom.

A feature and advantage of the present invention is the ability of such a device to provide structurally supported, integrally formed locking wells, wherein the defined well shape prevents undesired movement of a roll of sod once mounted on an elongated carrying rod retained therein.

A feature and advantage of the present invention is the ability of such a device to provide structurally supported, integrally formed wells to assist in distribution of the stress received from movement of a mounted roll of sod to the entire steel frame.

A feature and advantage of the present invention is the ability of such a device to eliminate the need for separate well supports, thereby reducing the required material and labor costs.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 3 is a perspective view of the sod roll installation device of FIG. 1, showing the device mounted on a mini skid-steer utility loader and a roll of sod being transported thereby.

FIG. 4 is a perspective view of the sod roll installation device of FIG. 1, showing the device mounted on a mini skid-steer utility loader and a roll of sod being installed thereby.

DETAILED DESCRIPTION OF THE PREFERRED AND ALTERNATE EMBODIMENTS

In describing the preferred and alternate embodiments of the present invention, as illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
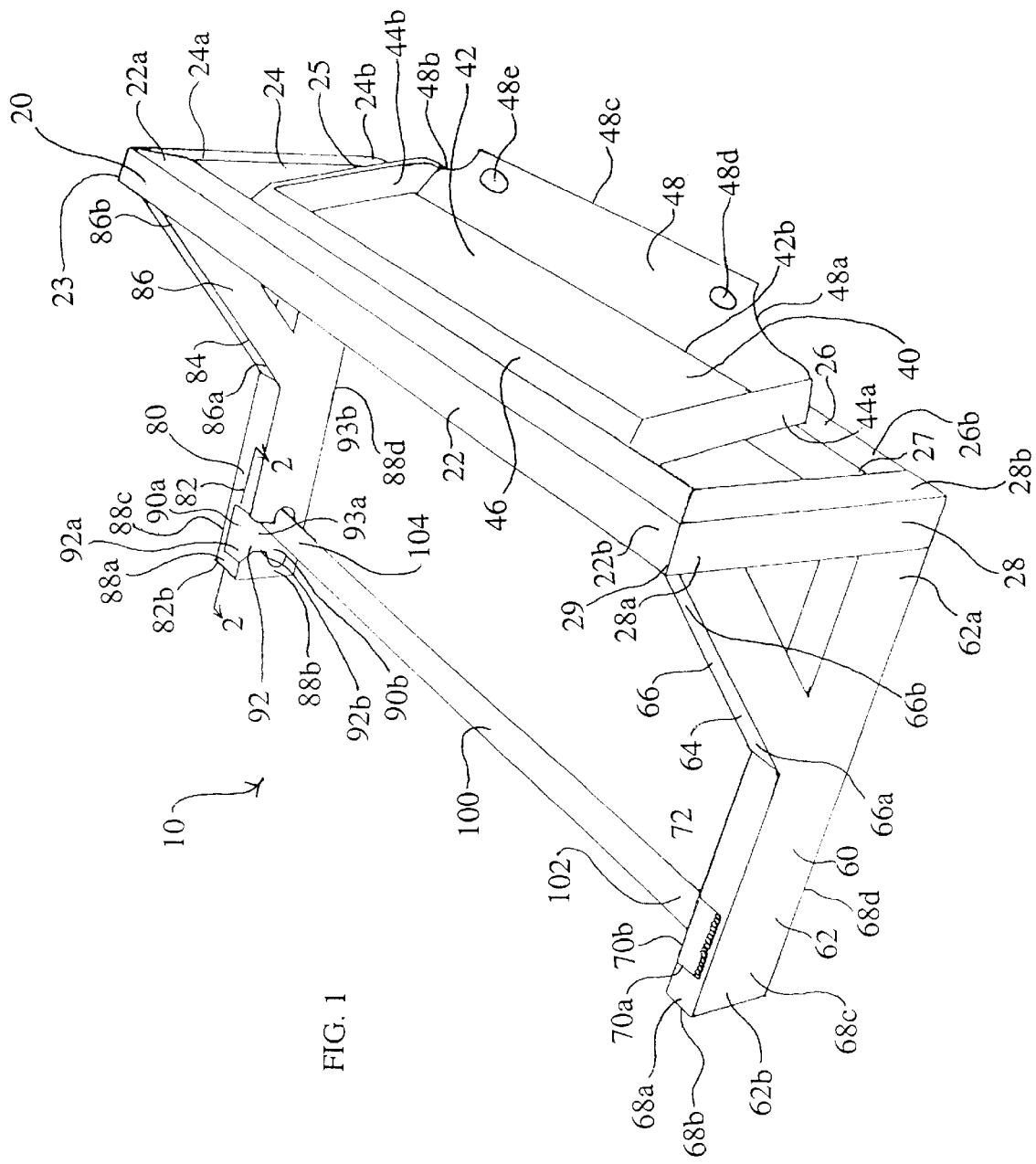
FIG. 1 is a perspective view of a sod roll installation device according to a preferred embodiment of the present invention, showing one of two optional cover plates.

Referring now to FIG. 1, the present invention is a sod roll installation device 10 comprising substantially rectangular-shaped rear frame 20, substantially rectangular-shaped mounting assembly 40, first support arm 60, second support arm 80 and substantially cylindrical-shaped elongated rod 100. Preferably, sod roll installation device 10 is welded steel. However, while shaped steel is the preferred material of manufacture, other appropriately strong and corrosion resistant alternatives could be used, such as, for exemplary purposes only, metal alloys, coated metals, iron or hardened plastics.

Substantially rectangular-shaped rear frame 20 is preferably defined by elongated, substantially rectangular-shaped beams 22 and 26, and elongated, substantially rectangular-shaped beams 24 and 28, wherein beams 22 and 26 are preferably perpendicular to beams 24 and 28. First end 22a of beam 22 is preferably welded to first end 24a of beam 24, thereby forming first corner 23 of rear frame 20. As best seen in FIG. 3 and FIG. 4, second end 24b of beam 24 is preferably welded to first end 26a of beam 26, thereby forming second corner 25 of rear frame 20. Referring again to FIG. 1, second end 26b of beam 26 is preferably welded to second end 28b of beam 28, thereby forming third corner 27 of rear frame 20. First end 28a of beam 28 is preferably welded to second end 22b of beam 22, thereby forming fourth corner 29 of rear frame 20.

Substantially rectangular-shaped mounting assembly 40 provides secure, removable mounting to a mini skid-steer compact utility loader, such as those sold under the trademark DINGO. However, while a known DINGO mount configuration is preferred, the novel sod roll installation attachment herein described could be utilized and configured for mounting on any multi-use vehicle adapted for landscape applications thereby providing the intended result, specified features and advantages encompassed within the concept of the invention herein presented. As such, mini skid-steer as used herein is used generally to represent all vehicles adapted for landscape applications.

Mounting assembly 40 is preferably defined by substantially flat plate 42, first side wall 44a, second side wall 44b, upper wall 46 and lower wall 48. Preferably, walls 44a, 44b, 46 and 48 are welded or otherwise formed to plate 42, wherein each wall 44a, 44b, 46 and 48 extends therefrom.

Preferably, upper wall 46 is substantially flat and substantially rectangular shaped, extending from upper edge 42a (not shown) of plate 42. Preferably, lower wall 48 is substantially flat, extending from lower edge 42b of plate 42. Preferably, mounting assembly 40 is welded to beam 22 and beam 26, proximate to upper wall 46 and lower wall 48, respectively, thereby fixably securing mounting assembly 40 into position on rear frame 20. Preferably, first edge 48a and second edge 48b of lower wall 48 extend arcuately from plate 42 to shortened outer edge 48c, wherein the length of outer edge 48c is preferably less than the length of lower edge 42b of plate 42. First substantially circular aperture 48d and second substantially circular aperture 48e are defined through lower wall 48 proximate to outer edge 48c, adjacent to first edge 48a and second edge 48b, respectively.

Preferably, first end 62a of first support arm 60 is positioned substantially perpendicular to beam 26 and is welded thereto proximate to corner 27 of rear frame 20, wherein first support arm 60 is preferably defined by elongated, substantially rectangular-shaped beam 62. Preferably, beam 62 is positioned substantially perpendicular to beam 28, wherein brace 64 extends at preferably an approximate forty-five degree angle therebetween. Brace 64 is preferably defined by elongated, substantially rectangular-shaped beam 66, with first end 66*a* of beam 66 welded to beam 62 and second end 66*b* of beam 66 welded to beam 28, thereby permanently enabling brace 64 to provide support to first support arm 60.

Elongated beam 62 of first support arm 60 has upper surface 68*a*, inner surface 68*b*, outer surface 68*c* and bottom surface 68*d*. Preferably, outer surface 68*c* and bottom surface 68*d* are substantially continuous and substantially flat. Preferably, upper surface 68*a* and inner surface 68*b* are substantially flat with cutouts 70*a* and 70*b* defined respectively therein. Preferably, cutout 70*a* of upper surface 68*a* is positioned proximate to second end 62*b* of elongated beam 62 and defines a substantially rectangular shaped opening therein.

Preferably, first end 82*a* of second support arm 80 is positioned substantially perpendicular to beam 26 and is welded thereto proximate to corner 25 of rear frame 20, as best seen in FIG. 3 and FIG. 4, wherein second support arm 80 is preferably defined by elongated, substantially rectangular-shaped beam 82. Preferably, beam 82 is positioned substantially perpendicular to beam 24, wherein brace 84 extends at preferably an approximate forty-five degree angle therebetween. Brace 84 is preferably defined by elongated, substantially rectangular-shaped beam 86, with first end 86*a* of beam 86 welded to beam 82 and second end 86*b* of beam 86 welded to beam 24, thereby permanently enabling brace 84 to provide support to second support arm 80.

Elongated beam 82 of second support arm 80 has upper surface 88*a*, inner surface 88*b*, outer surface 88*c* and bottom surface 88*d*. Preferably, outer surface 88*c* and bottom surface 88*d* are substantially continuous and substantially flat. Preferably, upper surface 88*a* and inner surface 88*b* are substantially flat with cutouts 90*a* and 90*b* defined respectively therein. Preferably, cutout 90*a* of upper surface 88*a* is positioned proximate to second end 82*b* of elongated beam 82 and defines a substantially rectangular shaped opening therein.

Figure 2:
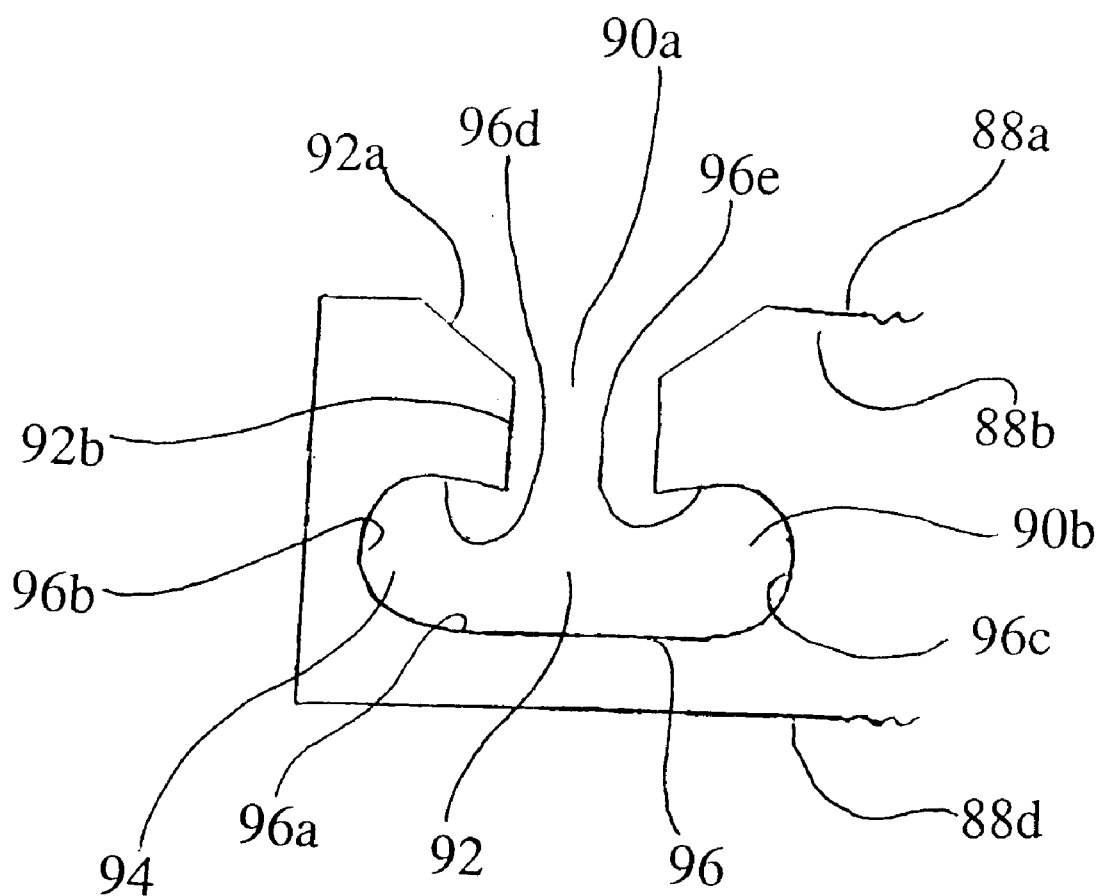
FIG. 2 is a sectional view along line 2—2 of FIG. 1, showing an integral locking well of the sod roll installation device of FIG. 1.

Preferably, cutout 90*b* of inner surface 88*b* is positioned to merge with cutout 90*a*, thereby creating second integral locking well 92. Cutout 90*b* effectively extends and gradually narrows the substantially rectangular shaped opening of cutout 90*a* toward bottom surface 88*d* of second support arm 80, thereby defining funnel shaped access point 92*a* for second integral locking well 92. As best seen in FIG. 2, cutout 90*b* preferably defines inverted "T"-shaped opening 93, wherein funnel shaped access point 92*a* merges with elongated, substantially rectangular shaped vertical portion 93*a* of inverted "T"-shaped opening 93, defining neck 92*b* of second integral locking well 92. Preferably, a substantially oval-shaped opening 94 defines substantially horizontal portion 93*b* of inverted "T"-shaped opening 93, thereby providing shaped base 96 of second integral locking well 92.

Preferably, shaped base 96 is defined by substantially flat bottom surface 96*a*, curved side walls 96*b* and 96*c*, and upper walls 96*d* and 96*e*, wherein substantially oval-shaped opening 94 is defined thereby. Preferably, first upper wall 96*d* extends from first curved side wall 96*b* toward neck 92*b* at an angle slightly directed towards bottom surface 96*a*, thereby defining a slightly arcuate shape for first upper wall 96*d*, whereby bar 100 is protectively engaged. Preferably, second upper wall 96*e* extends from second curved side wall 96*c* toward neck 92*b* at an angle slightly directed toward bottom surface 96*a*, thereby defining a slightly arcuate shape for second upper wall 96*e*, whereby bar 100 is protectively engaged.

Preferably, cutout 70*b* of inner surface 68*b* is positioned to merge with cutout 70*a*, thereby creating first integral locking well 72. Cutout 70*b* effectively extends and gradually narrows the substantially rectangular shaped opening of cutout 70*a* toward bottom surface 68*d* of first support arm 60, thereby defining funnel shaped access point 72*a* for first integral locking well 72. Although not shown, cutout 70*b* is an exact mirror image of cutout 90*b*, best seen in FIG. 2, wherein cutout 70*b* preferably defines inverted "T"-shaped opening 73, and wherein funnel shaped access point 72*a* merges with elongated, substantially rectangular shaped vertical portion 73*a* of inverted "T"-shaped opening 73, defining neck 72*b* of first integral locking well 92. Preferably, substantially oval-shaped opening 74 defines substantially horizontal portion 73*b* of inverted "T"-shaped opening 73, thereby providing shaped base 76 of first integral locking well 72.

Preferably, shaped base 76 is defined by substantially flat bottom surface 76*a*, curved side walls 76*b* and 76*c*, and upper walls 76*d* and 76*e*, wherein substantially oval-shaped opening 74 is defined thereby. Preferably, first upper wall 76*d* extends from first curved side wall 76*b* toward neck 72*b* at an angle slightly directed towards bottom surface 76*a*, thereby defining a slightly arcuate shape for first upper wall 76*d*, whereby bar 100 is protectively engaged. Preferably, second upper wall 76*e* extends from second curved side wall 76*c* toward neck 72*b* at an angle slightly directed toward bottom surface 76*a*, thereby defining a slightly arcuate shape for second upper wall 76*e*, whereby bar 100 is protectively engaged.

Preferably, substantially cylindrical-shaped elongated rod 100 has first end 102 and second end 104. First integral locking well 72 is dimensioned to receive first end 102 of rod 100, second integral locking well 92 is dimensioned to receive second end 104 of rod 100 and the length of rod 100 is dimensioned to extend between first and second integral locking wells 72 and 92. Rod 100 is removably positioned within integral wells 72 and 92, wherein respective substantially oval shaped openings 74 and 94 effectively lock rod 100 therein during use.

In an alternate embodiment, sod roll installation device 10 could be assembled utilizing bolts or any other securing means instead of welding. In addition, device 10 could be integrally molded.

In an alternate embodiment, sod roll installation device 10 could be manufactured from metal alloys, coated metals, iron, hardened plastics or any other appropriately strong and corrosion resistant material instead of steel.

In an alternate embodiment, the length of support arms 60 and 80 could be varied to enable accommodation of a variety of sod roll diameters.

In an alternate embodiment, the dimensions of substantially rectangular-shaped rear frame 20 and rod 100 could be increased to enable accommodation of a variety of sod roll widths.

In an alternate embodiment, mounting assembly could be configured to enable mounting on a variety of multi-use vehicles adapted for landscape applications.

In an alternate embodiment, support arms 60 and 80 and all beams could be substantially cylindrical-shaped instead of substantially rectangular shaped.

In an alternate embodiment, support braces 64 and 84 could be substantially triangular-shaped support plates instead of elongated beams.

In an alternate embodiment, rod 100 could have an increased circumference to provide increased strength, wherein first end 102 and second end 104 thereof could remain dimensioned to removably secure within locking wells 72 and 92.

In an alternate embodiment, locking wells 72 and 92 could carry hinged cover plates 73 (shown in FIG. 1) and 93 (not shown), respectively, wherein secure closure thereof would prevent rod 100 from passing through rectangular apertures 70 and 90, respectively.

In use, rod 100 is placed within a selected roll of sod having the dirt surface facing the exterior of the roll. First end 102 and second end 104 of rod 100 extend from the roll of sod. Assessing the size of the sod roll to be installed enables the individual installer to select the appropriately sized sod roll installation device 10. Mounting assembly 40 is utilized to securely and removably mount sod roll installation device 10 to a mini skid-steer utility loader. An individual operator directs mounted sod roll installation device 10 to the roll of sod to be installed, wherein rod 100 has been inserted. Mounted sod roll installation device 10 is positioned with integral locking wells 70 and 90 below extended ends 102 and 104 of rod 100, respectively. As mounted sod roll installation device 10 is raised, rod 100 enters into integral locking wells 70 and 90 and is held thereby.

To move a roll of sod that is held on rod 100, mounted sod roll installation device 10 is raised until the roll is no longer in contact with the ground, as best seen in FIG. 3. As the tilt angle of mounted sod roll installation device 10 increases, rod 100 is directed further into locking wells 70 and 90, whereby the locking feature thereof is enabled and accidental release of the roll is prevented.

To install a roll of sod that is held on rod 100, mounted sod roll installation device 10 is lowered until the roll is in contact with the ground, as best seen in FIG. 4. The individual installer then maneuvers the compact utility loader to unroll the sod carried thereby.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A sod roll installation device, comprising:
    a substantially rectangular shaped frame having a first end and a second end;
    a mounting means carried by said frame for mounting said frame to a utility vehicle;
    a first elongated arm carried by and extending from said frame proximate to said first end, said first arm having at least an upper side and an inner side, said first arm having a first well integrally formed therein;
    a second elongated arm carried by and extending from said frame proximate to said second end thereof, said second arm having at least an upper side and an inner side, and said second arm having a second well integrally formed therein;
    a first support means extending at least from said frame to said first elongated arm;
    a second support means extending at least from said frame to said second elongated arm; and
    a rod having a first end and a second end, said first end dimensioned to be removably received within said first well in said first elongated arm, said second end dimensioned to be removably received within said second well in said second elongated arm.

2. The sod roll installation device of claim 1, wherein said first well substantially defines an inverted "T" shape, said inverted "T" shape defining a substantially rectangular shaped aperture in said upper side of said first arm and an approximate inverted "T" shaped aperture in said inner side of said first arm, and wherein said second well substantially defines an inverted "T" shape, said inverted "T" shape defining a substantially rectangular shaped aperture in said upper side of said second arm and an approximate inverted "T" shaped aperture in said inner side of said second arm.

3. The sod roll installation device of claim 1, wherein said mounting means is a mounting plate.

4. The sod roll installation device of claim 1, wherein said device is manufactured of welded steel.

5. The sod roll installation device of claim 1, wherein said first support means is a first elongated beam extending from said frame, proximate to said first end thereof, to said first elongated arm, and wherein said second support means is a second elongated beam extending from said frame, proximate to said second end thereof, to said second elongated arm.

6. The sod roll installation device of claim 1, wherein said first support means is a first plate extending from said frame, proximate to said first end thereof to said first elongated arm, and wherein said second support means is a second plate extending from said frame, proximate to said second end thereof to said second elongated arm.

7. An accessory device for a mini-skid steer loader, comprising:
    a substantially rectangular shaped support structure having a first end and a second end;
    a mounting means carried by said support structure for securing said device to a mini-skid steer loader;
    a bar having a first end and a second end;
    a first elongated beam extending from said first end of said support structure, said first beam having at least an upper side and an inner side, and said first beam having a first recessed bar holder defined therein;
    a second elongated beam extending from said second end of said support structure, said second beam having at least an upper side and an inner side, and said second beam having a second recessed bar holder defined therein;
    a first reinforcement support carried by said support structure and said first beam; and
    a second reinforcement support carried by said support structure and said first beam.

8. The accessory device for a mini-skid steer loader of claim 7, wherein said first recessed bar holder defines an inverted "T" shape having a substantially rectangular shaped aperture defined in said upper side of said first elongated beam thereby defining an access point dimensioned to enable said first end of said first bar to enter and exit said first recessed bar holder therethrough, and having an inverted, substantially "T" shaped aperture defined in said inner side of said first elongated beam thereby defining a track dimensioned to limit movement of said bar positioned within said first recessed bar holder, and wherein said second recessed bar holder defines an inverted "T" shape having a substantially rectangular shaped aperture defined in said upper side of said second elongated beam thereby defining an access point dimensioned to enable said second end of said bar to enter and exit said second recessed bar holder therethrough, and having an inverted, substantially "T" shaped aperture defined in said inner side of said second elongated beam thereby defining a track dimensioned to limit movement of said bar positioned within said recessed bar holder.

9. The accessory device for a mini-skid steer loader of claim 7, wherein said mounting means is a mounting plate.

10. The accessory device for a mini-skid steer loader of claim 7, wherein said device is manufactured of welded steel.

11. The accessory device for a mini-skid steer loader of claim 7, wherein said support structure is a substantially rectangular shaped wall.

12. The accessory device for a mini-skid steer loader of claim 7, wherein said support structure is a substantially rectangular shaped frame.

13. A sod roll installation device for use with a compact utility loader, comprising:

a steel support frame having a first end and a second end;

a mounting bracket carried by said frame for securely positioning said sod roll installation device on a compact utility loader;

an elongated, substantially cylindrical support member having a first end and a second end, said support member dimensioned to be positioned within and to bear the weight of a roll of sod;

a first extended member carried by said support frame proximate to said first end thereof, said first extended member having at least an upper surface and an inner surface, said upper surface having a substantially rectangular shaped aperture defined therein and said inner surface having an inverted "T" shaped aperture defined therein, wherein said substantially rectangular shaped aperture enables positioning of said first end of said support member therein, thereby enabling access to said inverted "T" shaped aperture, and wherein said inverted "T" shaped aperture enables limited movement of said first end of said support member therein;

a second extended member carried by said support frame proximate to said second end thereof, said second extended member having at least an upper surface and an inner surface, said upper surface having a substantially rectangular shaped aperture defined therein and said inner surface having an inverted "T" shaped aperture defined therein, wherein said substantially rectangular shaped aperture enables positioning of said second end of said support member therein, thereby enabling access to said inverted "T" shaped aperture, and wherein said inverted "T" shaped aperture enables limited movement of said second end of said support member therein;

a first brace, said first brace reinforcing the connection between said first end of said support frame and said first extended member; and a second brace, said second brace reinforcing the connection between said second end of said support frame and said second extended member.

14. The sod roll installation device for use with a compact utility loader of claim 13, wherein said steel support frame is substantially rectangular shaped.

15. The sod roll installation device for use with a compact utility loader of claim 13, further comprising a first cover plate hingedly carried by said first extended member, said first cover plate positioned proximate to said substantially rectangular shaped aperture defined on said upper surface of said first extended member, thereby enabling locked closure thereof, and a second cover plate hingedly carried by said second extended member, said second cover plate positioned proximate to said substantially rectangular shaped aperture defined on said upper surface of said second extended member, thereby enabling locked closure thereof.

* * * * *